(12) United States Patent
 Yamamoto

(10) Patent No.: US 12,589,810 B2
(45) Date of Patent: Mar. 31, 2026

(54) ENGINE COMPARTMENT MOUNTED STRUCTURE

(71) Applicant: TOYOTA JIDOSHA KABUSHIKI KAISHA, Toyota (JP)

(72) Inventor: Kozo Yamamoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 18/602,198

(22) Filed: Mar. 12, 2024

(65) Prior Publication Data

US 2025/0019004 A1 Jan. 16, 2025

(30) Foreign Application Priority Data

Jul. 14, 2023 (JP) ................................. 2023-116139

(51) Int. Cl.
 *B62D 25/08* (2006.01)
 *B60L 53/16* (2019.01)
 *B60R 16/03* (2006.01)

(52) U.S. Cl.
 CPC ............ *B62D 25/082* (2013.01); *B60L 53/16* (2019.02); *B60R 16/03* (2013.01)

(58) Field of Classification Search
 CPC .. B62D 25/082; B62D 25/084; B62D 25/085; B60L 53/16; B60L 53/18; B60R 16/03; B60K 17/105
 See application file for complete search history.

(56) References Cited

U.S. PATENT DOCUMENTS

| | | | | | |
|---|---|---|---|---|---|
| 8,511,416 | B2 * | 8/2013 | Hiruma | ................... | B60K 1/00 |
| | | | | | 180/291 |
| 9,827,971 | B2 * | 11/2017 | Suzuki | .................. | B60L 53/126 |
| 10,464,613 | B2 * | 11/2019 | Okura | ...................... | B60K 5/12 |
| 10,814,711 | B2 * | 10/2020 | Suumen | ................. | B62D 25/20 |
| 11,794,819 | B2 * | 10/2023 | Hamada | ................... | B60K 6/28 |
| 11,912,133 | B2 * | 2/2024 | Tanizawa | ................. | B60L 9/18 |
| 12,257,905 | B2 * | 3/2025 | Ohno | ........................ | B60K 6/44 |
| 12,515,512 | B2 * | 1/2026 | Miyamoto | ............... | B60K 6/40 |
| 2008/0078603 | A1 * | 4/2008 | Taji | ........................... | H02K 5/00 |
| | | | | | 180/312 |
| 2010/0101885 | A1 * | 4/2010 | Nozaki | .................... | B60K 1/00 |
| | | | | | 180/232 |
| 2025/0019004 | A1 * | 1/2025 | Yamamoto | ........... | B62D 25/082 |
| 2025/0269745 | A1 * | 8/2025 | Yamamoto | ............. | B60L 53/18 |

FOREIGN PATENT DOCUMENTS

JP 2010-241291 A 10/2010

* cited by examiner

*Primary Examiner* — Jeffrey J Restifo
(74) *Attorney, Agent, or Firm* — SoraIP, Inc.

(57) ABSTRACT

An engine compartment mounted structure is provided with an engine mounted in an engine compartment of a vehicle, a charger mounted on the vehicle upper side of the transaxle mounted in the engine compartment and side by side in a vehicle width direction in a plan view, and a charging cable arranged from the charger to a charging port for external power supply connection provided on an outer plate of the vehicle, and the charging cable is arranged through a space between the engine and the charger.

3 Claims, 4 Drawing Sheets

ENGINE COMPARTMENT MOUNTED STRUCTURE

CROSS-REFERENCE TO RELATED APPLICATION

This application claims priority to Japanese Patent Application No. 2023-116139 filed on Jul. 14, 2023, incorporated herein by reference in its entirety.

BACKGROUND

1. Technical Field

The present disclosure relates to an engine compartment mounted structure.

2. Description of Related Art

A hybrid electric vehicle in which a charging cable for supplying electric power from an external power supply to a battery (charger) provided at a rear portion of a vehicle is mounted in an engine compartment in which an engine at a front portion of the vehicle is mounted has been conventionally known (see, for example, Japanese Unexamined Patent Application Publication No. 2010-241291 (JP 2010-241291 A)).

SUMMARY

However, in the case of a plug-in hybrid electric vehicle (PHEV) capable of charging, since there are many components mounted in an engine compartment such as an engine and a transaxle, it is difficult to efficiently secure a space for routing a charging cable in the engine compartment.

Therefore, an object of the present disclosure is to provide an engine compartment mounted structure capable of efficiently securing a space for routing a charging cable in an engine compartment.

In order to achieve the above object, an engine compartment mounted structure according to a first aspect of the present disclosure includes: an engine mounted in an engine compartment of a vehicle;

a charger mounted above a transaxle mounted in the engine compartment in a vehicle up-down direction and mounted side by side in a vehicle width direction with the engine in a plan view; and a charging cable routed from the charger to a charging port for external power supply connection provided on an outer plate of the vehicle, in which the charging cable is routed through a space between the engine and the charger.

According to the first aspect of the present disclosure, a charger is mounted in an engine compartment, and a charging cable connecting the charger and a charging port for external power supply connection is routed through a space between an engine and the charger. As described above, even when the charger is mounted in the engine compartment, the space for routing the charging cable in the engine compartment is efficiently secured.

Further, the engine compartment mounted structure according to the second aspect of the present disclosure is the engine compartment mounted structure according to the first aspect, and the charging cable is routed from a side of the charger facing the engine in the vehicle width direction to a vehicle rear side.

According to the second aspect of the present disclosure, the charging cable is routed from the side of the charger facing the engine in the vehicle width direction to the vehicle rear side. Therefore, even when there is no space forward of and rearward of the charger in a vehicle front-rear direction, and above the charger in the vehicle up-down direction, the charger can be mounted in the engine compartment.

Further, the engine compartment mounted structure according to the third aspect of the present disclosure is the engine compartment mounted structure according to the second aspect, and the charging cable routed from the side of the charger facing the engine in the vehicle width direction to the vehicle rear side is fixed to a dash panel in a deflected state.

According to the third aspect of the present disclosure, the charging cable routed from the side of the charger facing the engine in the vehicle width direction to the vehicle rear side is fixed to the dash panel in a deflected state. Therefore, the charging cable does not need to be affected by the vibration of the engine as compared with the case where the charging cable is fixed to the dash panel while the charging cable is not deflected.

As described above, according to the present disclosure, it is possible to efficiently secure the space for routing the charging cable in the engine compartment.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic plan view schematically showing an engine compartment mounted structure according to the present embodiment;

FIG. 2 is an enlarged schematic plan view of the engine compartment mounted structure according to the present embodiment;

DETAILED DESCRIPTION OF EMBODIMENTS

Figure 3:
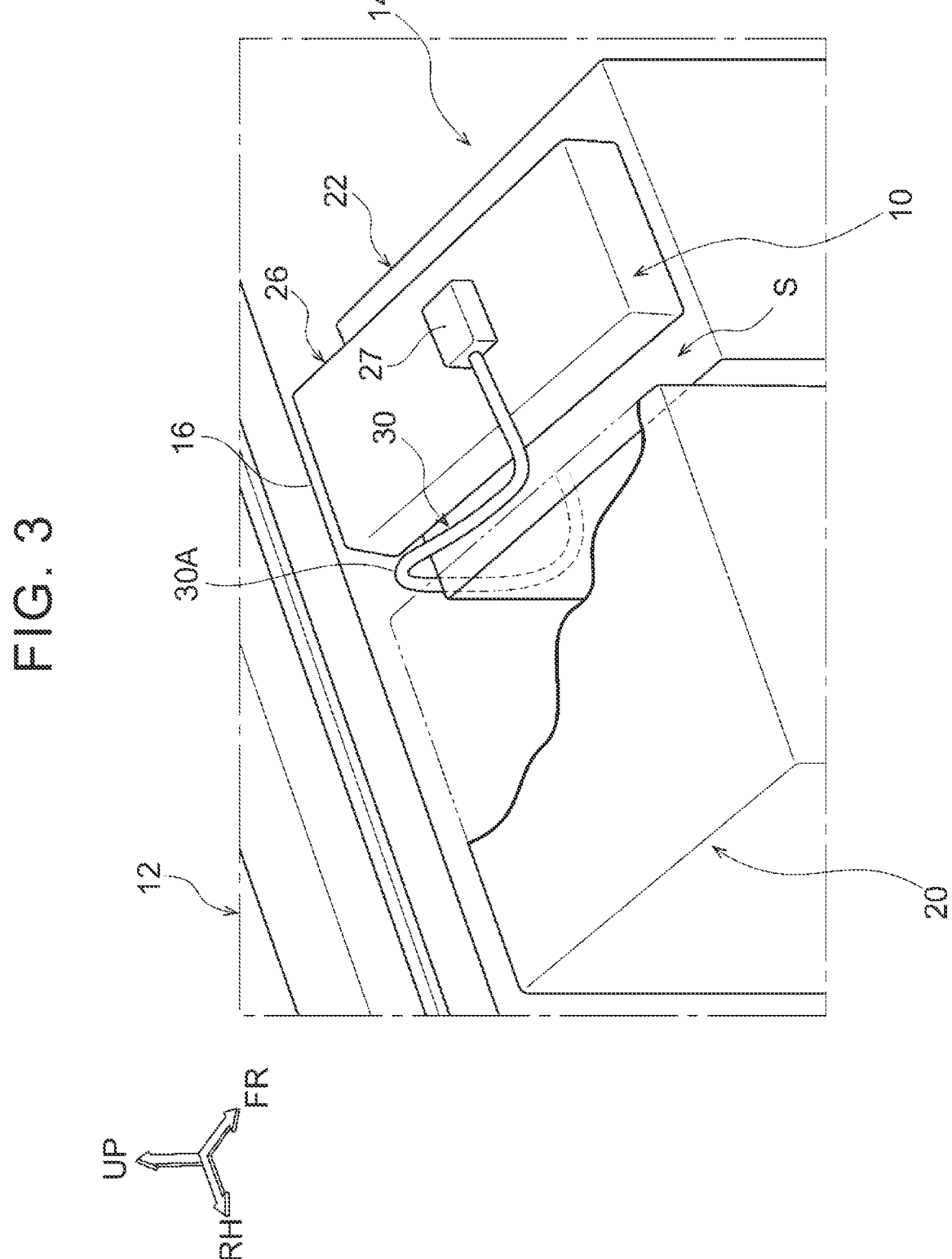
FIG. 3 is a schematic perspective view illustrating an enlarged engine compartment mounted structure according to the present embodiment.

Hereinafter, an embodiment according to the present disclosure will be described in detail with reference to the drawings. For convenience of description, the arrow UP, the arrow FR, and the arrow RH appropriately shown in the figures indicate the upward direction of a vehicle, the forward direction of the vehicle, and the right direction of the vehicle, respectively. Therefore, in the following description, when the vertical direction is described without special mention, it is assumed that the vertical direction of the vehicle is indicated. When the front and rear directions are described, the front and rear directions in the vehicle shall be indicated. When the right and left directions are described, the right and left directions in the vehicle are indicated. Further, the right-left direction is synonymous with a vehicle width direction.

Figure 1:
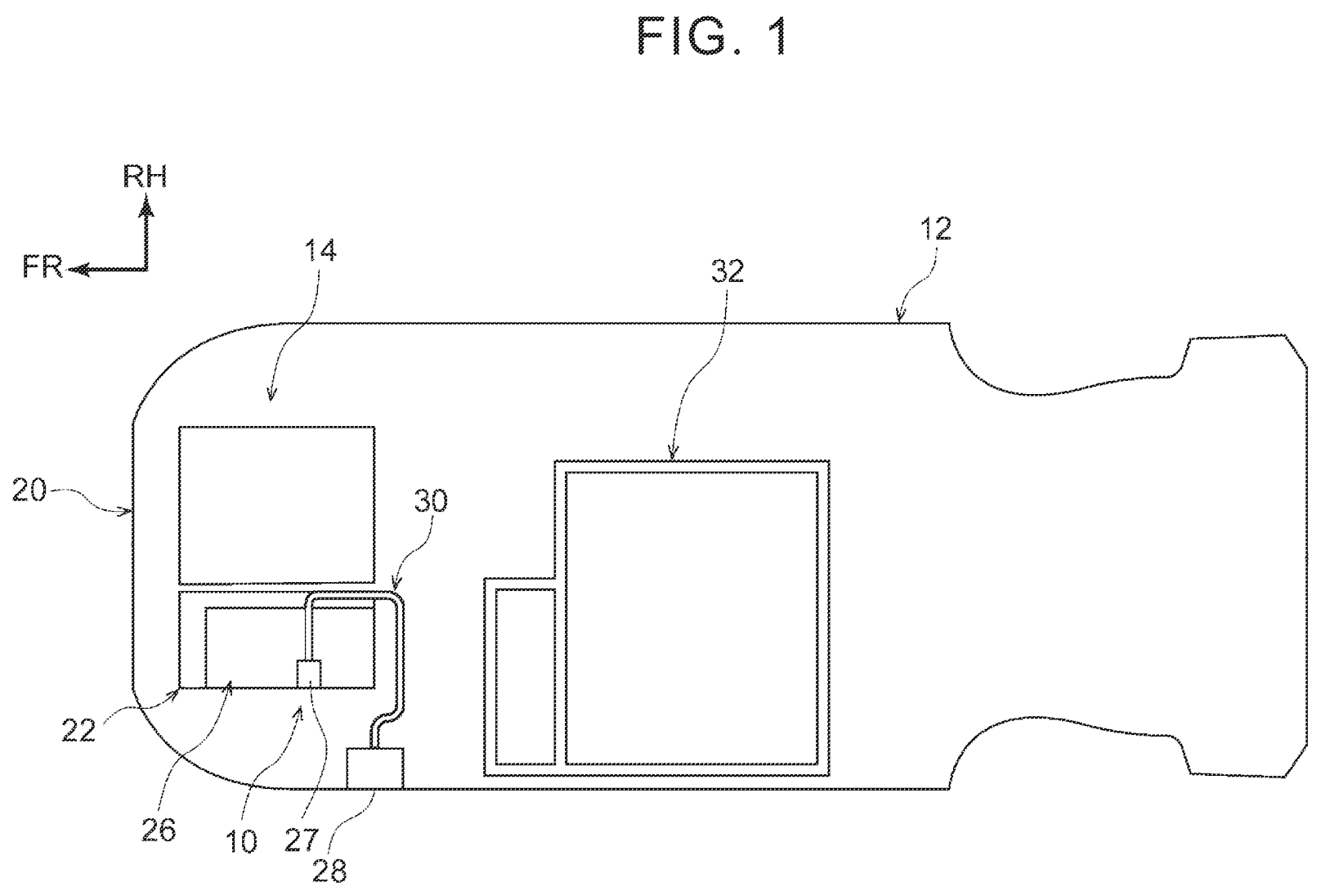

As shown in FIGS. 1 to 4, the engine compartment mounted structure 10 according to the present embodiment includes an engine 20 mounted in an engine compartment 14 at a front portion of the vehicle 12, a transaxle 22 mounted in the engine compartment 14 in a plan view in line with the engine 20 in the vehicle width direction, a charger 26 mounted on the upper side of the transaxle 22 and in a plan view in line with the engine 20 in the vehicle width direction, and a charging cable 30 that is routed from the charger 26 to a charging port 28 for external power supply connection provided on the outer plate of the vehicle 12.

For example, in the case of the vehicle 12 having the right steering wheel, the charging port 28 is provided at an upper portion of a left front fender (not shown) as an outer plate thereof. A battery 32 (see FIG. 1) charged through the charger 26 is mounted at a substantially central portion of the vehicle 12 in the front-rear direction. That is, the vehicle 12 according to the present embodiment is a chargeable plug-in hybrid electric vehicle (PHEV vehicle).

The charger 26 is formed in a substantially rectangular box shape having a predetermined thickness (low height) (see FIG. 3). The charger 26 is disposed on the upper surface of the transaxle 22 via a support member (not shown) in a posture in which the longitudinal direction thereof is along the front-rear direction. In addition, the transaxle 22 in the present embodiment is disposed on the left side of the engine 20 in the engine compartment 14.

In the engine compartment 14, a radiator 24 (see FIGS. 2 and 4) and a cooling device (not shown) for cooling the charger 26 are disposed on the front side (the front end in the engine compartment 14) of the engine 20 and the transaxle 22 (the charger 26). The cooling device and the charger 26 are connected by a pipe (not shown) through which the refrigerant passes.

In the engine compartment 14, a cowl 16 (see FIG. 4 and omitted in FIG. 2) extending in the vehicle width direction is disposed on the rear side of the engine 20 and the charger 26 (the rear end in the engine compartment 14) in a plan view. Further, the engine compartment 14 is covered from the upper side by an engine hood 13 (see FIG. 4) having a substantially flat plate shape. That is, the engine hood 13 extending in the front-rear direction and the vehicle width direction is arranged on the upper side of the engine 20 and the charger 26.

Figure 2:
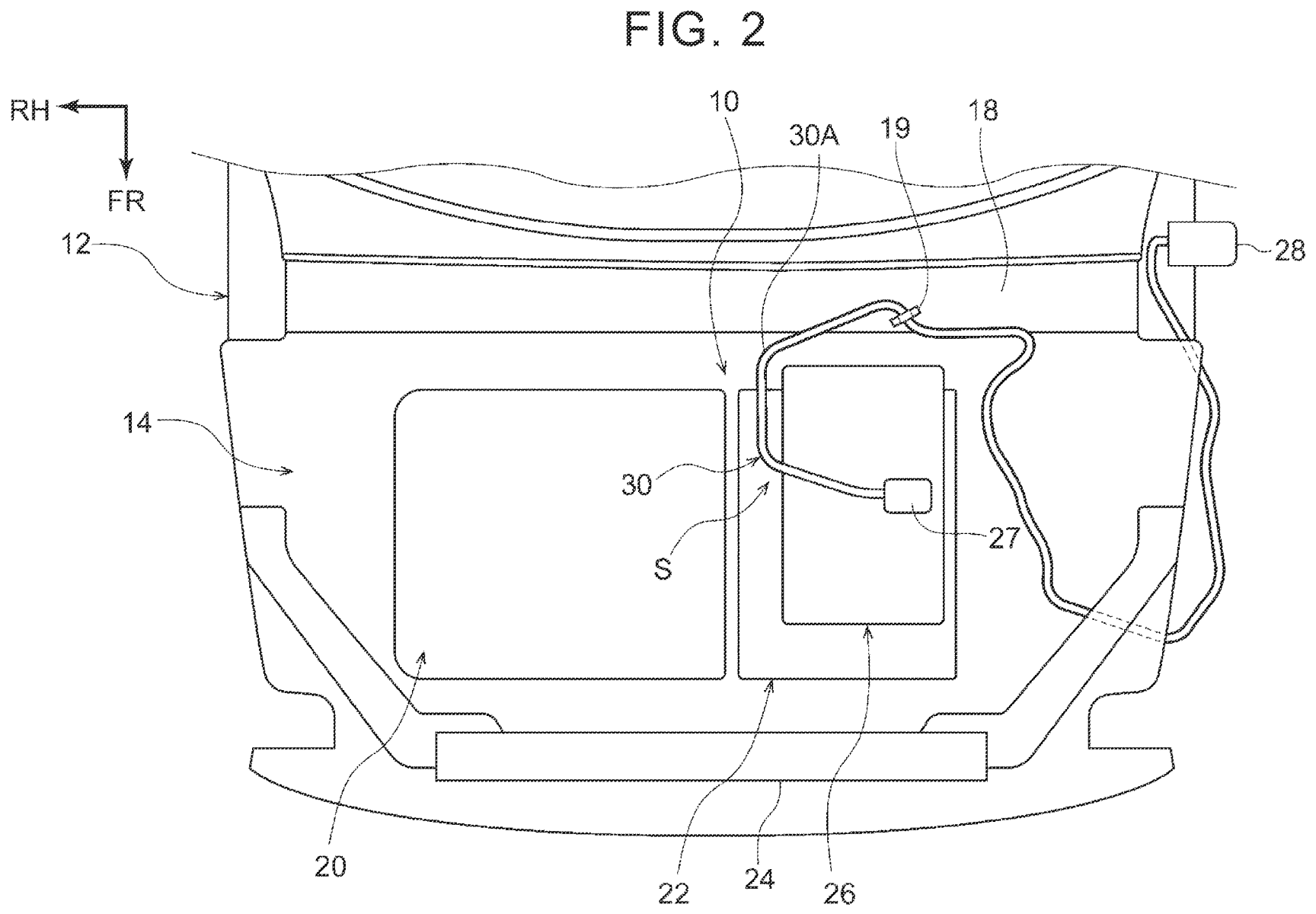

As shown in FIGS. 1 to 3, a space S (a gap that is a dead space) is formed between the upper portion of the engine 20 and the charger 26 (a portion opposed in the vehicle width direction) in a plan view, which is longer in the front-rear direction and wider in width (length along the vehicle width direction) than the outer diameter of the charging cable 30. The charging cable 30 in the present embodiment is routed through the space S.

Specifically, a connector 27 is provided at one end of the charging cable 30, the other end of which is connected to the charging port 28. The connector 27 is connected to, for example, a portion of the upper surface of the charger 26 that is substantially in the center in the front-rear direction and that is away from the engine 20. The charging cable 30 is routed to the rear side from the side facing the engine 20 of the charger 26 in the vehicle width direction.

That is, the charging cable 30 is drawn out from the connector 27 to the engine 20 side along the vehicle width direction, and then bent rearward so as to pass through the space S, and is wired. The charging cable 30 arranged to the rear side through the space S is bent downward on the front side of the cowl 16 and is arranged.

A part of the charging cable 30 bent downward is bent so as to have a certain margin. Then, a middle portion below the bent portion of the charging cable 30 (hereinafter, sometimes referred to as an "extra-long portion 30A") is fixed to the dash panel 18 by a fixture 19 (see FIG. 2) such as a clip.

Here, the engine 20 and the transaxle 22 are supported by a pair of left and right front side members (not shown) or the like via a mount (not shown), and vibration from the engine 20 is transmitted to the transaxle 22. Therefore, the vibration from the engine 20 is also transmitted to the charger 26 disposed on the upper side of the transaxle 22.

However, as described above, a part of the charging cable 30 drawn out from the charger 26 is bent (having an extra-long portion 30A). Therefore, even when the vibration of the engine 20 is transmitted to the charger 26 via the transaxle 22, the vibration can be absorbed by a part of the charging cable 30.

That is, even if the engine 20 vibrates (even if the charger 26 moves relative to the charging cable 30), the charging cable 30 is not affected. The deflection of the charging cable 30 (the extra-long portion 30A) in the present embodiment means that, for example, a substantially arc-shaped loop-shape is formed (see FIG. 4).

Next, the operation of the engine compartment mounted structure 10 according to the present embodiment configured as described above will be described.

In the vehicle 12 according to the present embodiment, since the transaxle 22 is miniaturized and the height thereof is reduced, the charger 26 is disposed on the upper side thereof. Therefore, compared with a PHEV vehicle (not shown) in which the charger 26 is disposed at the rear of the vehicle, the length of the charging cable 30 connecting the charger 26 and the charging port 28 can be shortened, and the length of the pipe connecting the charger 26 and the cooling device can be shortened.

Figure 4:
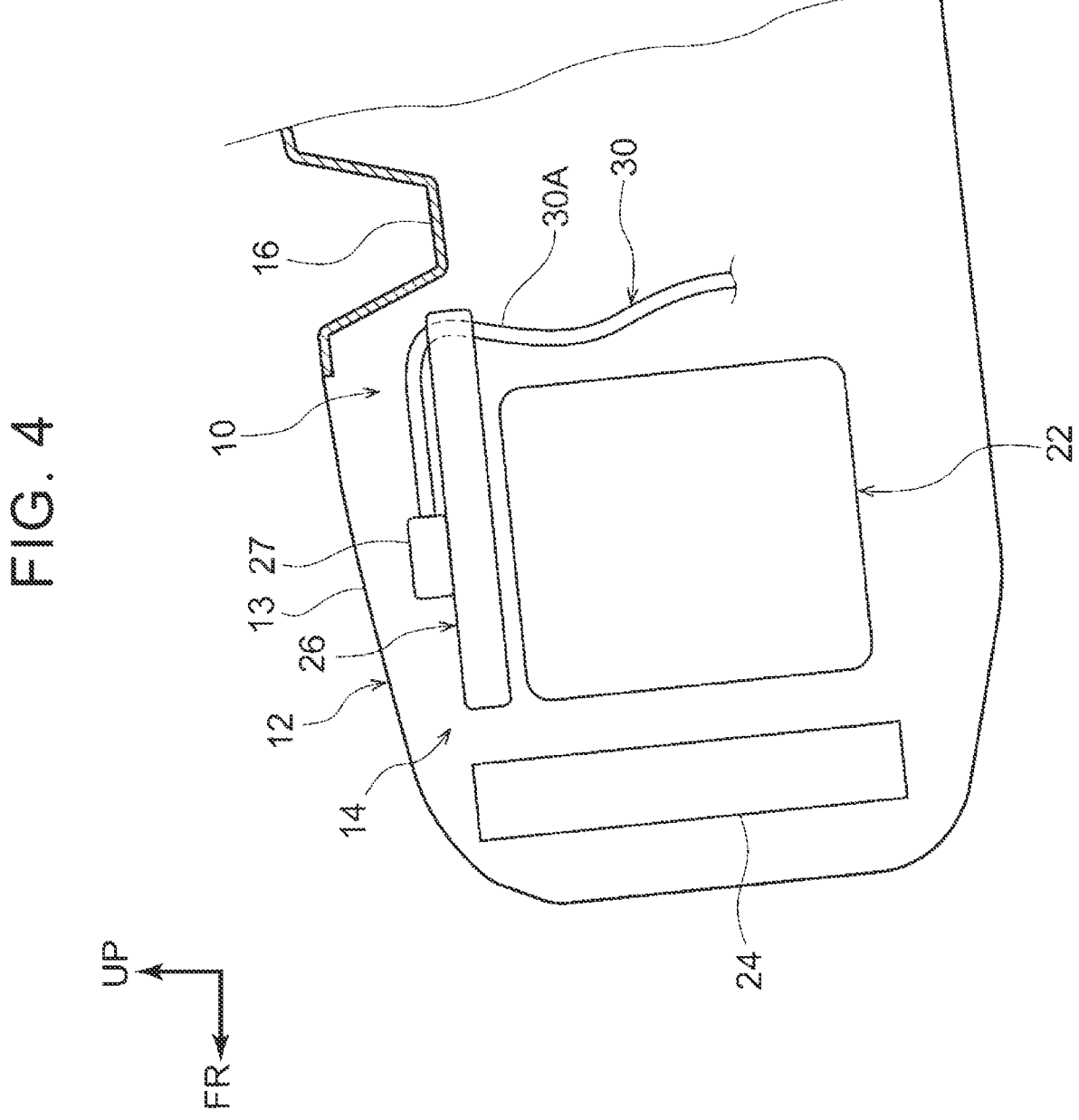
FIG. 4 is an enlarged schematic side view of the engine compartment mounted structure according to the present embodiment.

Further, as shown in FIG. 4, in the engine compartment 14 in the present embodiment, the radiator 24 is disposed on the front side of the charger 26, the cowl 16 is disposed on the rear side of the charger 26, and the engine hood 13 is disposed on the upper side of the charger 26. Therefore, it is difficult to route the charging cable 30 by pulling it out from the charger 26 toward the front side, the rear side, or the upper side.

Therefore, the charging cable 30 according to the present embodiment is drawn out from the side of the charger 26 facing the engine 20 in the vehicle width direction and is routed to the rear side. That is, the charging cable 30 in the present embodiment is routed through a space S (dead space) between the engine 20 and the charger 26.

In this way, even in a configuration in which the charger 26 is mounted in the engine compartment 14, it is possible to efficiently secure the space S for arranging the charging cable 30 in the engine compartment 14. In other words, the charger 26 can be mounted in the engine compartment 14 even if there is no space for pulling out the charging cable 30 on the front side, the rear side, and the upper side of the charger 26.

Further, as compared with the case where the charging cable 30 is drawn out from the charger 26 to the front side or the rear side or the upper side and arranged, the length of the engine compartment 14 in the front-rear direction does not need to be formed long, and the height of the engine compartment 14 in the up-down direction does not need to be formed high, so that the length of the front portion of the vehicle 12 along the front-rear direction and the height along the up-down direction can be reduced. That is, according to the engine compartment mounted structure 10 of the present embodiment, the front portion of the vehicle 12 can also be miniaturized.

Further, the charging cable 30 which is routed to the rear side is pulled out from the opposite side in the engine 20 and the vehicle width direction of the charger 26, in a state in which a part of which is flexed, and the lower side than the flexed portion (extra-long portion 30A) is fixed to the dash panel 18. Therefore, in comparison with the case where the charging cable 30 is fixed to the dash panel 18 without being bent (under tension), the vibration of the engine 20 can be absorbed by a part of the charging cable 30, and the influence of the vibration of the engine 20 can be suppressed from being received by the charging cable 30 (for example, the charging cable 30 is broken).

Although the engine compartment mounted structure 10 according to the present embodiment has been described with reference to the drawings, the engine compartment mounted structure 10 according to the present embodiment is not limited to the illustrated one, and can be appropriately changed in design without departing from the gist of the present disclosure.

For example, the charging port 28 may be provided at an upper portion of a right front fender (not shown) as an outer plate of the vehicle 12. Even in this case, the charging cable 30 is wired in the same manner as described above. Further, since the space S is long in the front-rear direction, even when the connector 27 is connected to the front end portion of the upper surface of the charger 26, for example, it is possible to route the charging cable 30.

What is claimed is:

1. An engine compartment mounted structure comprising:
an engine mounted in an engine compartment of a vehicle;
a charger mounted above a transaxle mounted in the engine compartment in a vehicle up-down direction and mounted side by side in a vehicle width direction with the engine in a plan view; and
a charging cable routed from the charger to a charging port for external power supply connection provided on an outer plate of the vehicle, wherein the charging cable is routed through a space between the engine and the charger.

2. The engine compartment mounted structure according to claim 1, wherein the charging cable is routed from a side of the charger facing the engine in the vehicle width direction to a vehicle rear side.

3. The engine compartment mounted structure according to claim 2, wherein the charging cable routed from the side of the charger facing the engine in the vehicle width direction to the vehicle rear side is fixed to a dash panel in a deflected state.

* * * * *